United States Patent [19]

Jenneve et al.

[11] Patent Number: 5,144,544

[45] Date of Patent: Sep. 1, 1992

[54] POWER FEED SYSTEM FOR TELEPHONE AND/OR INFORMATION TECHNOLOGY TERMINALS

[75] Inventors: Dany Jenneve; Gilles Misslin, both of Strasbourg, France

[73] Assignee: Alcatel Business Systems, Paris, France

[21] Appl. No.: 574,726

[22] Filed: Aug. 30, 1990

[30] Foreign Application Priority Data

Aug. 31, 1989 [FR] France .................. 89 11427

[51] Int. Cl.⁵ ............................... H02M 3/335
[52] U.S. Cl. ..................................... 363/21; 363/49; 363/56; 379/413
[58] Field of Search ............... 363/19, 20, 21, 49, 363/95, 97, 124; 323/901, 908, 266; 379/399, 413

[56] References Cited

U.S. PATENT DOCUMENTS

| | | | |
|---|---|---|---|
| 3,733,540 | 5/1973 | Hawkins | 323/901 |
| 3,818,306 | 6/1974 | Marini | 363/89 |
| 4,056,689 | 11/1977 | Freimanis | 379/413 |
| 4,499,532 | 2/1985 | Hudson et al. | 379/413 |
| 4,661,896 | 4/1987 | Kobayashi et al. | 323/266 |
| 4,679,132 | 7/1987 | Jirka | 379/413 |
| 4,697,229 | 9/1987 | Davy et al. | 323/901 |
| 4,704,670 | 11/1987 | Gradl et al. | 379/413 |
| 4,761,812 | 8/1988 | Hollis et al. | 363/21 |
| 4,813,066 | 3/1989 | Holtz et al. | 379/413 |

Primary Examiner—William H. Beha, Jr.
Attorney, Agent, or Firm—Sughrue, Mion, Zinn Macpeak & Seas

[57] ABSTRACT

A power feed system for telephone and/or information technology terminals (1) is connected to a transmission and remote power feed link (4) of the terminal and comprises a switch mode power supply unit (7) connected to the wires of the link and a regulator (8) at the output of the switch mode power supply unit which supplies at least part of the power required by the terminal and which includes a circuit to ensure progressive starting of the switch mode power supply unit when the terminal is powered up via the link.

4 Claims, 1 Drawing Sheet

POWER FEED SYSTEM FOR TELEPHONE AND/OR INFORMATION TECHNOLOGY TERMINALS

BACKGROUND OF THE INVENTION

The invention concerns power feed systems incorporated in telephone and/or information technology terminals connected to transmission lines which additionally feed them remotely with electrical power, for example S interface terminals connected by a passive bus to an integrated services digital network.

The conventional objective of such power feed systems is to limit to predetermined reasonable values the current that is likely to be drawn by a terminal from the transmission and power feed link to which it is connected. The addition of a switch mode power supply unit to a current limiter power feed system makes it possible to achieve greater flexibility in the use of the electrical power received by a terminal. However, a state in which the power feed system is disabled may arise if the power demand of the switch mode power supply unit exceeds what the power feed link can supply given the presence of the current limiter.

The existence of terminals fitted with standard connectors enables simple connection of a telephone and/or information technology installation according to the immediate and possibly temporary requirements of users, for example by simply plugging in at various points duly equipped with one or more connectors. It also implies that the terminals and in particular their power feed systems do not disrupt the operation of the remote power source, especially during connection operations, which can cause the power feed system to short-circuit the power source if the system comprises capacitors which are charged directly from the terminals of the remote power source via the transmission and power feed link to which the device is being connected.

It is also necessary to be able to connect a terminal to a transmission and power feed link already serving other terminals without interrupting their operation and any interchange of information that may be in progress. Failing perfect simultaneity of the connection of the various conductors of a terminal connector when making a connection to a multi-wire transmission and active power feed link, transient imbalance is likely to disrupt transmissions in progress on the link to an unacceptable degree.

SUMMARY OF THE INVENTION

The present invention therefore proposes a power feed system for telephone and/or information technology terminals adapted to be connected to a transmission link simultaneously supplying it with at least some of its required electrical power via a current limiter.

According to one characteristic of the invention, the power feed system comprises a switch mode power supply unit of the power converter type adapted to be connected to the wires of the link and a regulator which is connected to the output of the switch mode power supply unit and which includes the current limiter, said regulator supplying at least some of the power required by the terminal and comprising means for progressively starting up the switch mode power supply unit when said terminal is powered up via the link.

BRIEF DESCRIPTION OF THE DRAWINGS

The invention, its characteristics and its advantages are explained in the following description given with reference to the figures mentioned below.

DETAILED DESCRIPTION OF THE INVENTION

Figure 1:
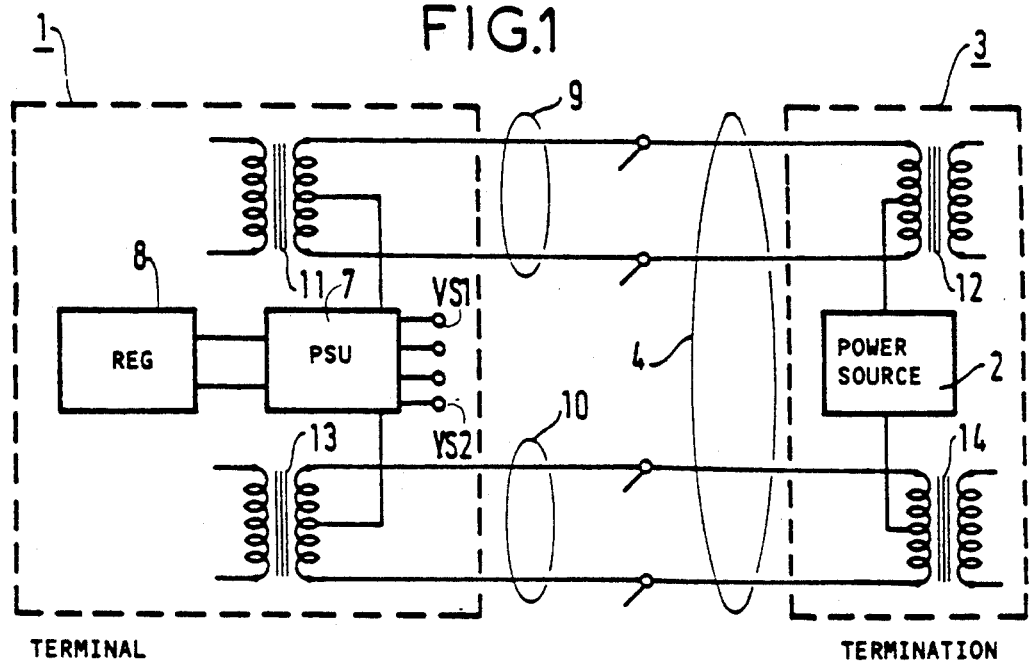
FIG. 1 is a theoretical circuit diagram showing a power feed system of a telephone and/or information technology terminal using a source in a remote line termination unit to which the terminal is connected by a transmission link which also provides the power feed.

The known system shown in FIG. 1 feeds electrical power to one or more telephone and/or information technology terminals 1 from a remote source 2 usually located in a line termination unit 3 (hereinafter designated 'termination') to which a transmission and power feed link 4 from the terminal(s) 1 is connected.

The terminals considered here are, for example, subscriber terminals of an integrated services digital network (ISDN) which have a standard S interface through which they are connected to a bus transmission and power feed link 4. Further information on the components mentioned above, which will not be explained in more detail here, and in particular on the terminals and the terminations, can be found in an article entitled "Les installations terminales d'abonnés" ("Subscriber terminal installations") published in 1987 in the third issue of the French journal "Commutation et transmission" and in the book "Le RNIS" ("The IDSN") published in Paris in 1987 under the pseudonym G. DICENET as part of the "Collection Technique des Télécommuncations".

Each terminal 1 includes a telephone and/or information technology device (which is not shown here because it is not directly related to the invention) and an auxiliary device adapted to supply at least part of its required electrical power from the link 4 to which the terminal is connected. A functional schematic of one example of telephone device is shown on page 189 of the book mentioned above. It combines an S interface management module with a module handling telephone and acoustic functions and a user-terminal dialog module that will not be described in more detail here.

The power feed auxiliary device 5 includes a switch mode power supply unit 7 of the usual power converter type supplied by the link 4 and a regulator 8 on the input side of the switch mode power supply unit relative to the link 4 and through which the terminal comprising it is at least partly fed with power.

In the example under discussion where the link 4 is of the ISDN bus type, the link comprises two pairs of wires 9 and 10 for transmitting separately signals in each of two transmission directions between the telephone and/or information technology device of the terminal and the corresponding device (not shown) in the termination 3. The pair 9 connects two transformers 11, 12 respectively located in the terminal 1 and in the termination 3. The pair 10 connects two other transformers 13, 14 respectively located in the terminal 1 and in the termination 3.

The phantom power feed to the terminal 1 from the source 2, which is in this instance located in the termination 3, is provided by the two pairs 9 and 10, the source 2 being connected between center-taps of the windings of the transformers 12 and 14 to the end-taps of which the two pairs are connected, while the switch mode power supply unit 7 is connected to center-taps of the windings of the transformers 11 and 13 to the end-taps of which the same pairs 9 and 10 are also connected. In a known manner (not shown here) the windings of the transformers 11 through 14 shown as unconnected serve transmit devices (not shown) of the terminal and of the termination comprising them.

The regulator 8 is connected to the link 4 through the switch mode power supply unit 7, the latter supplying to it the electrical power to be divided between the various circuits (not shown here) of the terminal 1. The regulator 8 is adapted to act on the switch mode power supply unit 7; which provides one or more supply voltages such as VS1 and VS2 for the various circuits of the terminal 1.

Figure 2:
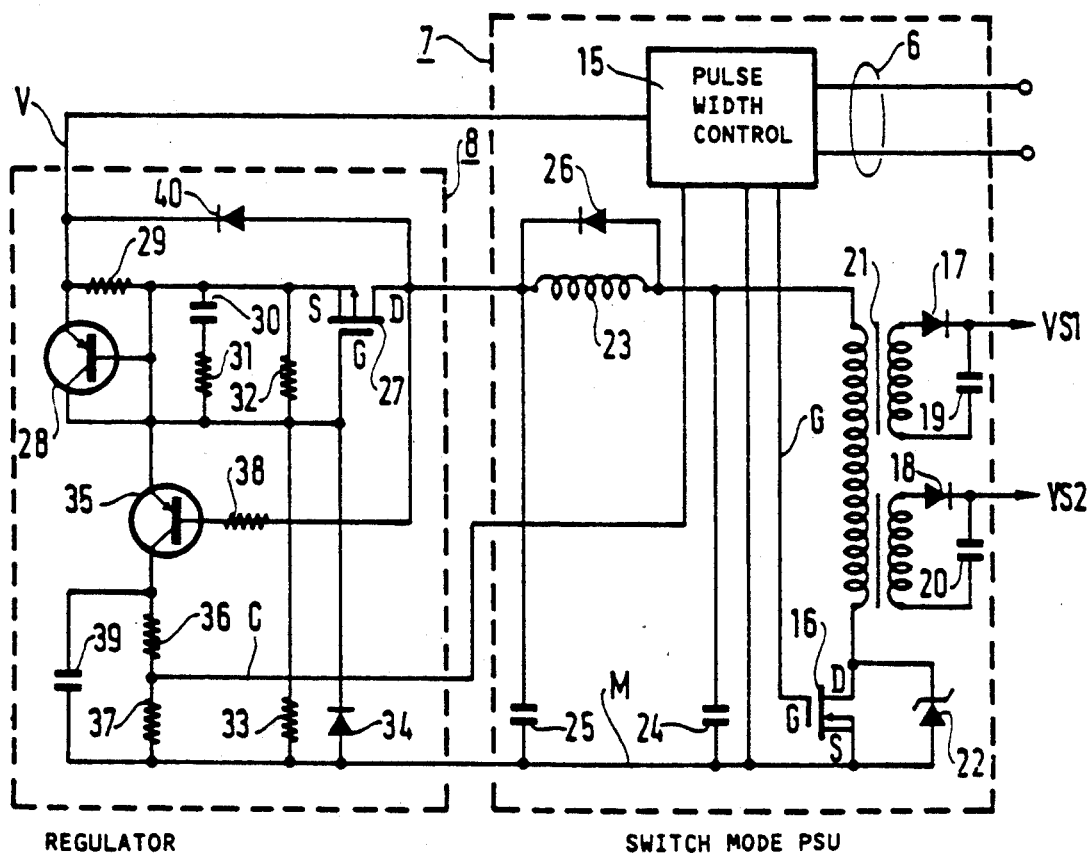
FIG. 2 is a schematic of a power feed system in accordance with the invention for a telephone and/or information technology terminal adapted to be connected to a transmission and power feed link.

The embodiment of the power feed system shown in FIG. 2 combines a regulator 8 with a switch mode power supply unit 7, as already described. It is connected between the center taps of windings of the transformers 11 and 13 to the end-taps of which the pairs 9 and 10 are connected, a pair of power feed wires 6 connecting the switch mode power supply unit 7 to these two center-taps.

The switch mode power supply unit 7 includes a switch mode MOS transistor 16 controlled by a device 15 adapted to vary the width of its control pulses as required; this conventional device 15 will not be described in detail as it is not directly related to the invention. In this embodiment it is responsive to signals supplied to it by the regulator 8 via a wire C in a manner to be explained later.

The voltages VS1 and VS2 supplied by the switch mode power supply unit 7, which are in this instance DC voltages, are produced by two rectifier circuits with diodes 17, 18 and capacitors 19, 20 each connected across one secondary winding of a transformer 21 whose primary is supplied with power under the control of the transistor 16.

The drain of this transistor is connected to a first terminal of the primary winding of the transformer 21. Its source is connected to a grounding wire M of the switch mode power supply unit 7. Its grid is connected to a wire G through which the device 15 controls its switching between the turned on and turned off states.

The transistor 16 is protected against overvoltages by a Zener diode 22 with its anode and its cathode respectively connected to the source and the drain of the transistor.

The second terminal of the primary winding of the transformer 21 is connected to the positive wire V of the power supply unit 7 via the regulator 8.

A radio frequency filter comprising an inductor 23 and two capacitors 24 and 25 is connected across the circuit comprising the primary winding of the transformer 21 and the transistor 16 in series. The capacitor 24 is connected across the combination formed by the winding a freewheel diode 26 and the transistor 16 in series. A freewheel diode 26 is conventionally associated with this inductor 23.

An MOS second transistor 27 in the regulator 8 has its drain connected to the point common to the capacitor 25 and the inductor 23, at the output of the switch mode power supply unit filter. It is connected on the input side of the inductor to the positive wire V by a current limiter including a PNP transistor 28 and a low-value resistor 29 in series between the source of the transistor 27 and the wire V. The resistor 29 is connected between the emitter and the base of the transistor 28 to serve as its bias resistor, the base and collector of this transistor being connected to the grid of the transistor 27.

A time-delay circuit comprising a capacitor 30 and a resistor 31 in series is connected between the source and the grid of the transistor 27 in parallel with a high-value resistor 32. A resistor 33 is associated with the resistor 32 to form a divider bridge between the source of the transistor 27 and wire M connected to the source of the transistor 16, the point common to the resistors 32 and 33 being connected to the grid of the transistor 27. A diode 34 with its anode connected to the wire M is connected in parallel with the high-value resistor 33 between the wire M and the grid of the transistor 27.

A PNP transistor 35 is connected on the input side of a resistor divider bridge 36, 37 to send a control signal to the switch mode power supply unit 7 dependent on the voltage between the drain and the source of the transistor 27. To this end the base of the transistor 35 is connected to the drain of the transistor 27 via a resistor 38, its emitter is connected to the grid of the transistor 27 and its collector is connected to one end of the resistor divider bridge 36, 37 whose other end is connected to the wire M, a capacitor 39 shunting this bridge. The control wire C connected to the point common to the resistors 36 and 37 transmits the control signal to the switch mode power supply unit.

A diode 40 with its anode connected to the drain of the transistor 27 and its cathode connected to the emitter of the transistor 28 completes the circuit.

The regulator 8 limits the current drawn from the remote source 2 when the terminal 1 is powered up and if the terminal 1 is short circuited. For a terminal with a maximum consumption of 1 W, for example, the theoretical current at 40 V is 25 mA while that at 25 V is 40 mA. Additionally, it is necessary to allow for the inrush current and the energy to be stored on power up. To this end the transistor 28 is prevented from turning on until the current in the resistor 29 reaches a sufficient value. In one embodiment where the voltage normally present on the wire V is 40 V and where the resistor 29 has a value of approximately 10 ohms the transistor 28 turns on only when the current in the resistor 29 exceeds 70 mA.

In normal operation the transistor 28 is turned off and the grid of the transistor 27 is biased by the resistor divider bridge 32, 33 to a value such that the transistor 27 is turned fully on, its source and its drain being virtually short-circuited; the power feed to the terminal 1 is then normally under the control of the switch mode power supply unit.

The inductor 23 protects the MOS transistors against excessively sudden variations in current and the diode 26 is a freewheel diode, as already mentioned.

If excessive current is drawn, in this instance more than 70 mA, the transistor 28 turns on, the grid and the source of the transistor 27 are at the same potential and the transistor 27 turns off, so that power is no longer fed to the primary winding of the transformer 21.

The transistor 35 operates in its linear range according to the voltage between the source and the drain of the transistor 27. It controls the power operating ranges of the switch mode power supply unit 7 via the wire C and by means of the variable voltage across the resistor 37.

Here this voltage is positive and varies upwards from 0 V. It is used to vary the switching duty cycle imposed by the device 15 by means of the transistor 16.

If the terminal 1 is designed so that it can be connected to the link 4 when the latter is in service and consequently live it is important that the terminal should not begin to draw electrical power over the link until it is connected to all four wires of the link, for the reasons explained in the preamble.

To this end when the terminal 1 is powered up via the link 4 the time-delay circuit comprising the capacitor 30 and the resistor 31 delays the increase in voltage between the grid and the source of the transistor 27 while the capacitor 30 is charging, the transistor 35 turns on and enables the capacitor 39 to charge and turn off the transistor 16.

The power transmitted by the link 4 then reaches only as far as the transformer 21 and the circuits on the output side of this transformer are not fed with power. When the capacitors have charged the transistor 27 is turned on and this turns off the transistor 35 so that the capacitor 39 discharges slowly through the resistors 36 and 37 to ensure progressive starting of switch mode operation by the circuit 7.

The transistor 35 prevents switch mode operation when current limiting is applied.

The diode 40 protects the transistors 27 and 28 against reverse currents from the capacitors 24 and 25 under any conditions likely to lead to the rapid discharging of these.

We claim:

1. A power feed system for a terminal which is at least partly fed by a telephone transmission and power supply link, said system comprising:
   a power converter type switch mode power supply unit connected to said link;
   a regulator connected to an input of said power supply unit and including a current limiter through which said terminal is at least partly fed by said link;
   means for progressively starting up said power supply unit when said terminal is powered up via said link, by temporarily delaying the supply of power to the terminal by the switch mode power supply unit.

2. Power feed system according to claim 1, characterized in that the temporary delaying of the supply of power is provided by a means for temporarily delaying the supply of power comprising said current limiter and a time-delay circuit comprising a capacitor and a resistor in series between the grid and the source of said MOS transistor, and a second capacitor connected between the source of the MOS transistor and a ground wire via a further transistor, said time-delay circuit turning off a switch mode transistor of the switch mode power supply unit during charging of the second capacitor when the terminal is powered up via the link.

3. A power feed system for a terminal which is at least partly fed by a telephone transmission and power supply link, said system comprising:
   a power converter type switch mode power supply unit connected to said link;
   a regulator connected to an input of said power supply unit, said regulator comprising
      an MOS transistor having a grid and having a source connected to a positive power feed wire of the terminal, said MOS transistor monitoring the continuity of said positive power feed wire according to the signal applied to its grid,
      a resistor divider bridge for biasing said grid of said MOS transistor, said bridge comprising plural resistors connected between the positive power feed wire and a ground wire and having an intermediate point to which said grid is connected, and
      a current limiter through which said terminal is at least partly fed by said link, said current limiter comprising a PNP transistor having a base, a collector connected to said grid, and an emitter connected via a low-value resistor to said base and to said source of said MOS transistor; and
   means for progressively starting up said power supply unit when said terminal is powered up via said link.

4. A power feed system according to claim 3, wherein said base of said PNP transistor is connected to said positive power feed wire upstream of said MOS transistor.

* * * * *